US005856255A

United States Patent [19]
Krzystowczyk et al.

[11] Patent Number: 5,856,255

[45] Date of Patent: *Jan. 5, 1999

[54] PREPARATION OF SUPPORTED AUXILIARY CATALYSTS AT ELEVATED TEMPERATURE AND PRESSURE IN A CLOSED VESSEL

[75] Inventors: Niomi L. Krzystowczyk; Steven P. Diefenbach; John Y. Lee, all of Baton Rouge, La.

[73] Assignee: Albemarle Corporation, Richmond, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 589,668

[22] Filed: Jan. 22, 1996

[51] Int. Cl.[6] .............................. B01J 31/00; B01J 37/00; C08F 4/02; C08F 4/60

[52] U.S. Cl. .......................... 502/150; 502/104; 502/107; 502/108; 502/152

[58] Field of Search .................................... 502/104, 102, 502/108, 152, 150

[56] References Cited

U.S. PATENT DOCUMENTS

| | | | |
|---|---|---|---|
| 3,993,588 | 11/1976 | Thukral | 502/104 |
| 4,246,134 | 1/1981 | Uvarov et al. | 526/141 |
| 4,433,082 | 2/1984 | Grot | 524/755 |
| 4,650,778 | 3/1987 | Klabunde et al. | 502/104 |
| 4,808,561 | 2/1989 | Welborn, Jr. | 502/104 |
| 4,871,705 | 10/1989 | Hoel | 502/117 |
| 4,939,217 | 7/1990 | Stricklen | 502/113 |
| 5,057,475 | 10/1991 | Canich et al. | 502/104 |
| 5,126,301 | 6/1992 | Tsutsui et al. | 502/108 |
| 5,188,998 | 2/1993 | Bueschges et al. | 502/104 |
| 5,240,894 | 8/1993 | Burkhardt et al. | 502/108 |
| 5,308,816 | 5/1994 | Tsutsui et al. | 502/108 |
| 5,332,706 | 7/1994 | Nowlin et al. | 502/104 |
| 5,399,636 | 3/1995 | Alt et al. | 526/129 |
| 5,466,649 | 11/1995 | Jejelowo | 502/103 |
| 5,534,474 | 7/1996 | Becker | 502/152 |
| 5,629,253 | 5/1997 | Chang | 502/111 |
| 5,658,840 | 8/1997 | Kolle et al. | 502/104 |
| 5,739,368 | 4/1998 | Krzystowczyk et al. | 502/104 |

FOREIGN PATENT DOCUMENTS

| | | |
|---|---|---|
| 0336593 | 10/1989 | European Pat. Off. . |
| 0 426 637 | 5/1991 | European Pat. Off. . |
| 0516458 | 12/1992 | European Pat. Off. . |
| 0672671 | 9/1995 | European Pat. Off. . |
| 9421691 | 9/1994 | WIPO . |
| 9618661 | 6/1996 | WIPO . |
| 9635729 | 11/1996 | WIPO . |

OTHER PUBLICATIONS

P.W. Atkins, "Physical Chemistry", Great Britain, Oxford University Press, p.54, 1978 No Month.

*Primary Examiner*—Mark L. Bell
*Assistant Examiner*—J. Pasterczyk
*Attorney, Agent, or Firm*—Philip M. Pippenger

[57] ABSTRACT

A slurry is formed from an auxiliary catalyst (e.g., an aluminoxane or organoboron compound), a porous inorganic oxide carrier, and an inert organic solvent. The slurry is enclosed in a closed vessel and the temperature and pressure of the enclosed slurry are increased to a temperature of from about 80° C. to 250° C. and a pressure of from about 5 to 500 psig such that a supported composition is produced in the vessel. After opening the closed vessel, the supported composition and the solvent are separated from each other.

11 Claims, No Drawings

PREPARATION OF SUPPORTED AUXILIARY CATALYSTS AT ELEVATED TEMPERATURE AND PRESSURE IN A CLOSED VESSEL

This invention relates generally to a process for supporting olefin polymerization catalyst components and catalyst systems on a carrier and more particularly to a novel process for supporting auxiliary catalysts (i.e. catalyst activators, stabilizers or other materials which aid in the functioning of the primary olefin polymerization catalyst) such as aluminoxanes or organoboron compounds on a carrier, such as silica or alumina, in combination with an olefin polymerization catalyst such as a metallocene, and/or a non-metallocene transition metal compound, which process employs a closed system under superatmospheric pressure and elevated temperature.

Catalyst activators such as aluminoxanes and organoboron compounds, are used in combination with various types of metallocenes and/or transition metal compounds to catalyze olefin oligomerization and polymerization. These catalyst components can be supported on inert solid carriers such as metal oxides, for example silica or alumina, for use in heterogeneous and gas phase polymerizations. The catalyst components can either be added to the carrier in sequence such as is described, for example, in U.S. Pat. No. 4,808,561 or they can be pre-reacted such as is described, for example, in U.S. Pat. No. 5,240,894. The catalyst components and/or support are usually contained in an organic solvent which is removed after the catalyst components are mixed with the carrier at temperatures of from about −50 to 200° C. so as to form a dry, free flowing carrier material which includes the catalyst. The formation of such supported catalysts has heretofore been carried out at atmospheric or reduced pressure.

In accordance with this invention there is provided a process for supporting an auxiliary catalyst on a carrier, said process comprising mixing said auxiliary catalyst, said carrier, and an organic solvent at a temperature of from about 40° to 250° C. at superatmospheric pressure.

Also provided is a process for making a supported olefin polymerization catalyst, said process comprising forming a reaction product of at least one metallocene and/or transition metal catalyst material and at least one auxiliary catalyst, wherein at least one of said catalyst material and said auxiliary catalyst is combined with a carrier material in the presence of an organic solvent at a temperature of from about 40° to 250° C. at superatmospheric pressure.

As used herein, the term “auxiliary catalysts” means catalyst activators, catalyst stabilizers or other materials which aid in the functioning of olefin polymerization catalysts such as metallocenes or Ziegler-Natta catalysts.

Non-limiting examples of such auxiliary catalysts for use in the process of the invention include organo-aluminum compounds, and especially hydrocarbylaluminoxanes, and organoboron compounds.

Hydrocarbylaluminoxanes may exist in the form of linear, cyclic, caged or polymeric structures with the simplest monomeric compounds being a tetraalkylaluminoxane such as tetramethylaluminoxane, $(CH_3)_2AlOAl(CH_3)_2$, or tetraethylaluminoxane, $(C_2H_5)_2AlOAl(C_2H_5)_2$. The compounds preferred for use in olefin polymerization catalysts are oligomeric materials, sometimes referred to as polyalkylaluminoxanes, which usually contain about 4 to 20 of the repeating units:

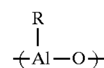

where R is $C_1$–$C_{10}$ alkyl and especially preferred are polymethylaluminoxanes (MAOs). Although the linear and cyclic aluminoxanes are often noted as having the structures

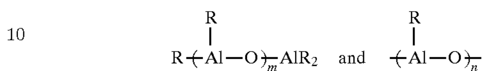

where m and n are integers of 4 or more, the exact configuration of aluminoxanes remains unknown.

Methylaluminoxanes can contain some higher alkyl groups to improve their solubility. Such modified methylaluminoxanes are described, for example, in U.S. Pat. No. 5,157,008. Besides MAO, non-limiting examples of hydrocarbylaluminoxanes for use in the invention include ethylaluminoxanes (EAO), isobutylaluminoxanes (IBAO), n-propylaluminoxanes, n-octylaluminoxanes, and the like. The hydrocarbylaluminoxanes can also contain up to about 20 mole percent (based on aluminum) of moieties derived from amines, alcohols, ethers, esters, phosphoric and carboxylic acids, thiols, alkyl disiloxanes and the like to improve activity, solubility and/or stability.

The aluminoxanes can be prepared as known in the art by the partial hydrolysis of trialkylaluminum compounds. The trialkylaluminum compounds can be hydrolyzed by adding either free water or water containing solids, which can be either hydrates or porous materials which have absorbed water. Because it is difficult to control the reaction by adding water per se, even with vigorous agitation of the mixture, the free water is usually added in the form of a solution or a dispersion in an organic solvent. Suitable hydrates include salt hydrates such as, for example, $CuSO_4 \bullet 5H_2O$, $Al_2(SO_4)_3 \bullet 18H_2O$, $FeSO_4 \bullet 7H_2O$, $AlCl_3 \bullet 6H_2O$, $Al(NO_3)_3 \bullet 9H_2O$, $MgSO_4 \bullet 7H_2O$, $MgCl_2 \bullet 6H_2O$, $ZnSO_4 \bullet 7H_2O$, $Na_2SO_4 \bullet 10H_2O$, $Na_3PO_4 \bullet 12H_2O$, $LiBr \bullet 2H_2O$, $LiCl \bullet 1H_2O$, $LiI \bullet 2H_2O$, $LiI \bullet 3H_2O$, $KF \bullet 2H_2O$, $NaBr \bullet 2H_2O$ and the like and alkali or alkaline earth metal hydroxide hydrates such as, for example, $NaOH \bullet H_2O$, $NaOH \bullet 2H_2O$, $Ba(OH)_2 \bullet 8H_2O$, $KOH \bullet 2H_2O$, $CsOH \bullet 1H_2O$, $LiOH \bullet 1H_2O$ and the like. Mixtures of any of the above hydrates can be used. The mole ratios of free water or water in the hydrate or in porous materials such as alumina or silica to total alkyl aluminum compounds in the mixture can vary widely, such as for example from about 2:1 to 1:4 with ratios of from about 4:3 to 1:3.5 being preferred.

Such hydrocarbylaluminoxanes and processes for preparing hydrocarbylaluminoxanes are described, for example, in U.S. Pat. Nos. 4,908,463; 4,924,018; 5,003,095; 5,041,583; 5,066,631; 5,099,050; 5,157,008; 5,157,137; 5,235,081; 5,248,801, and 5,371,260 whose entire teachings are incorporated herein by reference. The methylaluminoxanes contain varying amounts, of from about 5 to 35 mole percent, of the aluminum value as unreacted trimethylaluminum. Preferably the aluminum content as trimethylaluminum is less than about 23 mole percent of the total aluminum value, and more preferably less than about 20 mole percent.

Non-limiting examples of boron activator compounds include triaryl boranes such as tris(pentafluorophenyl) borane and tetrakis(pentafluorophenyl)borate salts such as trialkyl-substituted ammonium salts, for example, triethylammonium tetra(phenyl)boron, tripropylammonium tetra (phenyl) boron, tri(n-butyl)ammonium tetra(phenyl)boron, trimethylammonium tetra(p-tolyl)boron, trimethylammonium tetra(o-toly)boron, tributylammonium tetra (pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl) ammonium tetra(o-tolyl)boron and the like; N,N,-dialkyl anilinium salts for example N,N-dimethylanilinium tetra (phenyl) boron, N,N-diethylanilinium tetra (phenyl) boron, N,N-2,4,6-pentamethylanilinium tetra(phenyl)boron and the like; dialkyl ammonium salts for example di(isopropyl) ammonium tetra(pentafluorophenyl)boron, dicyclohexylammonium tetra(phenyl)boron and the like; and triaryl phosphonium salts for example triphenylphosphonium tetra (phenyl)boron, tri(methylphenyl)phosphonium tetra (phenyl)boron, tri-(dimethylphenyl)phosphonium tetra (phenyl)boron and the like.

Examples of other activator/stabilizer compounds for use as auxiliary catalysts are described, for example, in U.S. Pat. Nos. 5,064,802; 5,427,991; 5,278,119 and 5,434,116, whose teachings with respect thereto are incorporated herein by reference.

Non-limiting examples of the primary olefin polymerization catalysts include metallocenes and/or transition metal compounds. As used in the specification and claims, the term "metallocene" includes metal derivatives which contain at least one cyclopentadienyl moiety. Suitable metallocenes are well known in the art and include the metallocenes of Groups 3, 4, 5, 6, lanthanide and actinide metals, for example, the metallocenes which are described in U.S. Pat. Nos. 2,864,843; 2,983,740; 4,665,046; 4,874,880; 4,892,851; 4,931,417; 4,952,713; 5,017,714; 5,026,798; 5,036,034; 5,064,802; 5,081,231; 5,145,819; 5,162,278; 5,245,019; 5,268,495; 5,276,208; 5,304,523; 5,324,800; 5,329,031; 5,329,033; 5,330,948, 5,347,025; 5,347,026; and 5,347,752, whose teachings with respect to such metallocenes are incorporated herein by reference.

Non-limiting, illustrative examples of such metallocenes are bis(cyclopentadienyl)zirconium dimethyl, bis (cyclopentadienyl)zirconium dichloride, bis (cyclopentadienyl)zirconium monomethylmonochloride, bis (cyclopentadienyl)titanium dichloride, bis (cyclopentadienyl)titanium difluoride, cyclopentadienylzirconium tri-(2-ethylhexanoate), (biscyclopentadienyl)zirconium hydrogen chloride, bis (cyclopentadienyl)hafnium dichloride, racemic and meso dimethylsilanylene-bis(methylcyclopentadienyl)hafnium dichloride, racemic dimethylsilanylene-bis(indenyl)hafnium dichloride, racemic ethylene-bis(indenyl)zirconium dichloride, ($\eta^5$-indenyl)hafnium trichloride, ($\eta^5$—$C_5Me_5$)-hafnium trichloride, racemic dimethylsilanylene-bis-(indenyl)thorium dichloride, racemic dimethylsilanylene-bis(4,7-dimethyl-1-indenyl)zirconium dichloride, racemic dimethylsilanylene-bis(indenyl)uranium dichloride, racemic dimethylsilanylene-bis(2,3,5-trimethyl-1-cyclopentadienyl) -zirconium dichloride, racemic dimethylsilanylene(3-methyl-cyclopentadienyl)hafnium dichloride, racemic dimethyl-silanylene-bis (1-(2-methyl-4-ethyl)indenyl zirconium dichloride; racemic dimethylsilanylene-bis(2-methyl-4,5,6,7-tetrahydro-1-indenyl)-zirconium dichloride, bis (pentamethylcyclopentadienyl)thorium dichloride, bis (pentamethylcyclopentadienyl)uranium dichloride, (tertbutylamido) dimethyl (tetramethyl-$\eta^5$-cyclopentadienyl)silanetitanium dichloride, (tert-butylamido)dimethyl(tetramethyl-$\eta^5$-cyclopentadienyl) silanechromium dichloride, (tert-butylamido) dimethyl (-$\eta^5$-cyclopentadienyl) silanetitanium dichloride, (tert-butylamido)dimethyl(tetramethyl-$\eta^5$-cyclopentadienyl) silanemethyltitanium bromide, (tert-butylamido) (tetramethyl-$\eta^5$-cyclopentadienyl)-1,2-ethanediyluranium dichloride, (tert-butylamido) (tetramethyl-$\eta^5$-cyclopentadienyl)-1,2-ethanediyltitanium dichloride, (methylamido)(tetramethyl-$\eta^5$-cyclopentadienyl)-1,2-ethanediylcerium dichloride, (methylamido) (tetramethyl-$\eta^5$-cyclopentadienyl) 1,2-ethanediyltitanium dichloride, (ethylamido)(tetramethyl-$\eta^5$-cyclopentadienyl) methylenetitanium dichloride, (tert-butylamido)dibenzyl (tetramethyl-$n^5$-cyclopentadienyl) silanebenzylvanadium chloride, (benzylamido)dimethyl(indenyl)silanetitanium dichloride, and (phenylphosphido)dimethyl (tetramethyl-$\eta^5$-cyclopentadienyl)silanebenzyltitanium chloride.

Suitable transition metal compounds include the well known Ziegler-Natta catalyst compounds of Group 4–6 metals. Non-limiting illustrative examples of such transition metals include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_{17})_2Br_2$, $VCl_4$, $VOCl_3VO$ $(OC_2H_5)_3$, $ZrCl_4$, $ZrCl_3(OC_2H_5)$, $Zr(OC_2H_5)_4$ and $ZrCl(OC_4H_9)_3$ and the like.

As known in the art the solid support can be any particulate solid, and particularly porous supports. Non-limiting examples include talc, magnesium halides, zeolites, inorganic oxides, and resinous support material such as polyolefins. A preferred support material is an inorganic oxide in finely divided form. Such inorganic oxide support materials include Group IIA, IIIA, IVA or IVB metal oxides such as silica, alumina, silica-alumina and mixtures thereof. Other inorganic oxides that may be employed either alone or in combination with the silica, alumina or silica-alumina are magnesia, titania, zirconia, and the like. Other suitable support materials are finely divided polyolefins such as finely divided polyethylene.

The specific particle size, surface area, pore diameter, pore volume, etc. of the support materials are selected as known in the art. For example, particle sizes of from about 0.1 to 600 micrometers, surface area of from about 50 to 1000 $m^2/g$, pore diameters of from about 50–500 angstroms and pore volumes of from about 0.3 to 5.0 cc/g. The supports can be dehydrated either chemically or by heating at temperatures of from about −100° to 1000° C. in a dry inert gas for 1–24 hours as is known in the art.

In one aspect of the invention, an auxiliary catalyst material (or materials) is combined with the support in the presence of an inert organic solvent. The dry support can be added to a solution of the auxiliary catalyst or vice versa. Alternatively, solid auxiliary catalyst can be combined with a solvent slurry of the carrier. The temperature is maintained at from about 40° to 250° C., preferably 60° to 150° C., and the pressure at from about 5 to 500 psig, preferably 5 to 50 psig, such as by using a closed system. An inert gas can be used to further increase the pressure. The use of superatmospheric pressure has, depending in part upon the nature of the auxiliary catalyst material, one or more of the following technical and economic advantages. A closed system does not require a condensing column and cooling system. Higher temperatures which more rapidly, tightly adhere the auxiliary catalyst material to the support can be used. Lower boiling solvents can be used which makes solvent removal easier during drying. Degradation of temperature sensitive materials such as methyl aluminoxanes (MAO's) may also be reduced by suppressing gas formation while the high temperature, i.e. $\geqq$130° C. can act to release more methylaluminoxane from its complex with the trimethylaluminum (which is normally present in MAO's) for coating onto the support material.

Non-limiting examples of organic solvents for use in the process include aliphatic hydrocarbons such as pentane, isopentane, hexane, cyclohexane, heptane, octane, decane, dodecane, hexadecane, octadecane and the like, with those having carbon numbers of 5 to 10 being preferred, and aromatic hydrocarbons such as benzene, chlorobenzene, toluene, xylene, cumene and the like, with those having carbon numbers of 6 to 20 being preferred. The aromatic solvents are preferred. The amount of solvent used is not critical and is generally chosen to be from about 0.5 to 50, preferably 5 to 50 times, the total weight of coating material and carrier.

The primary olefin polymerization catalyst can be combined with the support either before, after or simultaneously with the auxiliary catalyst. The catalyst can also be prereacted with the auxiliary catalyst material.

The total loading of the catalyst system components on the support and the relative proportions of primary and auxiliary catalyst materials can vary over a wide range and are chosen based on the particular materials and the polymerization application which are involved. For example, primary catalysts are usually employed in amounts of from about 0.01 to 10 mmoles/g of support and, when using aluminoxanes as catalyst activators, the catalyst components are generally used in proportions to provide mole ratios of metal atom in the catalyst to aluminum atom of from about 0.0002:1 to 0.2:1, although greater or lesser amounts can be used.

The supported catalyst systems which are prepared according to the process of the invention are useful in producing olefin polymers and especially ethylene polymers, propylene polymers, ethylene/α-olefin copolymers, styrene polymers and copolymers and the like.

The invention is further illustrated by, but is not intended to be limited to, the following Examples.

EXAMPLE 1

A supported methylaluminoxane is prepared in a closed system. Approximately 16 kg of toluene are loaded into the reactor. 1.305 kg of vacuum dried (200° C.) silica gel is transferred to the reactor under nitrogen pressure and slurried in the toluene. The slurry is then cooled to −10° C. Once the starting temperature is reached, 4.39 kg of 30% MAO in toluene is slowly transferred to the reactor, maintaining the reactor temperature at or below 40° C. Once the transfer is complete, the reactor is sealed and the reactor temperature is raised to 130° C. with steam on the reactor jacket. The reaction is allowed to proceed for three hours at about 30 psig. After three hours, the reactor is cooled to room temperature and the catalyst allowed to settle. The catalyst is washed three times with toluene and then isolated on filters. The catalyst is blown dry with nitrogen and stored. The yield of supported MAO was 1.9 kilograms. Yield of supported MAO was 1.9 kilograms. Scanning electron microscopy/cross-sectional analysis indicates that aluminum was evenly distributed throughout the individual silica particles.

EXAMPLE 2

A final ethylene polymerization catalyst is prepared in a closed system. Approximately 15 kg of toluene is loaded into a stirred tank reactor. 1.35 kg of vacuum dried (200° C.) silica gel is transferred under nitrogen pressure into the reactor and the resulting slurry is stirred. In another stirred tank reactor, 3.9 kg of 30% methylaluminoxane in toluene is reacted with 81 grams of racemic ethylene bis(indenyl) zirconium dichloride. The resulting solution is then slowly transferred to the first reactor under nitrogen pressure. The reactor is sealed and heated by steam on the jacket to 110°–130° C. at a pressure of 10 psig. The reaction is allowed to proceed for 1½ hours and then cooled. The slurry is filtered, washed with two solvents and dried under vacuum. It is then stored. Yield of supported catalyst was 2.2 kg. Activity based on a standard polymerization test procedure was 8600 g PE/g catalyst/hour. Scanning electron microscopy/cross-sectional analysis showed aluminum evenly distributed within the individual silica particles.

EXAMPLE 3

A final polymerization catalyst is prepared in a two step process. The supported MAO is prepared according to Example 1. The supported MAO is then returned to the stirred tank reactor and slurried in 15 kg of toluene. The metallocene catalyst is dissolved in 20 kg of toluene in a second stirred tank reactor under nitrogen pressure (10 psig) and at 60°–70° C. The solution is slowly transferred to the supported MAO slurry. The reaction mixture is allowed to stir for 2 hours. The agitation is stopped, the reaction mixture allowed to settle and the final product is washed 3 times. The final slurry is filtered and the product is blown dry with nitrogen. The product is then stored in an inert environment. Yield was 0.980 kg. The activity, based on a standard polymerization test procedure, was 8300 g PE/g catalyst/hour. Scanning electron microscopy/cross-sectional analysis showed aluminum evenly distributed within the individual silica particles.

What is claimed is:

1. A process for supporting an auxiliary catalyst on a carrier, said process comprising:

a) forming a slurry consisting of said auxiliary catalyst, a porous inorganic oxide carrier, and an inert organic solvent;

b) enclosing said slurry in a closed vessel and increasing the temperature and pressure of said slurry while so enclosed to a temperature of from about 80° C. to 250° C. and a superatmospheric pressure of from about 5 to 500 psig such that a supported composition is produced; and c) opening said closed vessel after said supported composition has been formed therein, and separating said solvent and said supported composition from each other.

2. The process of claim 1 wherein said auxiliary catalyst is an organoboron compound.

3. The process of claim 1 wherein said auxiliary catalyst is an aluminoxane.

4. The process of claim 3 wherein said aluminoxane is a polymethylaluminoxane.

5. The process of claim 3 wherein said aluminoxane is a methylaluminoxane in which from about 5 to about 35 mole percent of the aluminum value is unreacted trimethylaluminum.

6. The process of claim 5 wherein about 5 to about 20 mole percent of the aluminum value is unreacted trimethylaluminum.

7. The process of claim 3 wherein said carrier is a dried silica gel and said solvent is an aromatic hydrocarbon solvent.

8. The process of claim 1 wherein in c) said solvent and said supported composition are separated from each other by filtration to isolate the supported composition, and by blowing the isolated supported composition dry with nitrogen.

9. The process of claim 1 wherein said auxiliary catalyst is an aluminoxane, wherein said carrier is silica, and wherein said solvent is an aromatic hydrocarbon solvent.

10. A process for supporting a polymethylaluminoxane on a silica carrier, said process comprising:

a) forming a slurry consisting of porous silica in toluene, the slurry being at a higher temperature than about −10° C.;

b) cooling the slurry to about −10° C. and adding thereto a solution of a polymethylaluminoxane in toluene while keeping the temperature below 40° C., to thereby form a mixture consisting of the silica, the polymethylaluminoxane, and toluene;

c) enclosing the mixture formed in b) inside a sealed vessel and raising the temperature of the sealed vessel to about 130° C. with an internal pressure of about 30 psig such that a supported composition is produced; and d) opening said sealed vessel after the supported composition has been formed therein, and separating the toluene and the supported composition from each other.

11. The process of claim 10 wherein in d) the toluene and the supported composition are separated from each other by filtration to isolate the supported composition, and by blowing the isolated supported composition dry with nitrogen.

* * * * *